United States Patent [19]

Palanisamy et al.

[11] Patent Number: 4,876,495
[45] Date of Patent: Oct. 24, 1989

[54] APPARATUS AND METHOD FOR CHARGING AND TESTING BATTERIES

[75] Inventors: Thirumalai G. Palanisamy, Morris Township, Morris County; Stuart E. Mendelson, Kendall Park, both of N.J.

[73] Assignee: Allied-Signal Inc., Morris Township, Morris County, N.J.

[21] Appl. No.: 211,609

[22] Filed: Jun. 27, 1988

[51] Int. Cl.$^4$ .............................................. H02J 7/04
[52] U.S. Cl. ........................................ 320/18; 320/21; 320/22
[58] Field of Search ...................... 320/20, 21, 22–24, 320/17, 18

[56] References Cited

U.S. PATENT DOCUMENTS 4,745,349  5/1988  Palanisamy et al. ................... 320/22

*Primary Examiner*—R. J. Hickey
*Attorney, Agent, or Firm*—Richard C. Stewart; Gerhard H. Fuchs

[57] ABSTRACT

This invention relates to a method for charging a rechargeable battery especially lead-acid batteries. In this method, the open circuit voltage of the battery is measured and the minimum number of cells is estimated from this value. The battery is then charged at any charge rate and at a constant current until the battery voltage is substantially equal to the estimated number of cells multiplied by a voltage which is characteristic of the battery, and thereafter the battery is charged at any charge rate and at the aforesaid battery voltage until the current decreases to some predetermined value. The foregoing steps are repeated alternatively until a constant or substantially constant value for the estimate number of cells is obtained. Thereafter, the battery is charged at a voltage equal to the number of cells multiplied by the characteristic voltage of the battery until the current reaches a predetermined value and then the battery is charged at some predetermined current for a predetermined period of time.

4 Claims, 3 Drawing Sheets

APPARATUS AND METHOD FOR CHARGING AND TESTING BATTERIES

RELATED APPLICATION

This application is related to U.S. patent application Ser. No. 919,417, filed Oct. 16, 1986, now U.S. Pat. No. 4,745,349.

BACKGROUND OF THE INVENTION

1. Field of the Invention

This invention relates to a method and apparatus, for charging and testing rechargeable batteries, especially lead-acid batteries of any capacity and voltage. More particularly, this invention relates to such a method and apparatus by which the characteristics of the battery, such as fault conditions are diagnosed in detail, and in which charging characteristics are automatically adjusted to suit the battery characteristics and the battery is charged with maximum efficiency and speed.

2. Prior Art

Methods and apparatus for determining the true capacity, nominal voltage, state of charge, defects, gassing, charge acceptance, and other characteristics of the battery helps to charge it efficiently, quickly and safely. Manual determination of these parameters is expensive and time consuming. With the introduction of microprocessor based autonomous chargers these operating characteristics are determined automatically and the battery is charged under optimum conditions.

Typically, the industrial lead-acid batteries have charge capacities of hundreds of ampere-hours. For maximum utilization, these batteries should be recharged quickly for the next use cycle. To prevent damage to the battery, it should be recharged soon after its use. The battery charger should be simple to operate, and should warn the user of battery defects and when to change the battery. It is desired that defective and unsafe conditions of the battery during charge should be indicated.

Some early commercial chargers employed constant charging current for a preset duration. Depending on the charge time available (the time the battery should be ready for use) and the capacity, the operator sets the charging current level. The efficiency of this type of charger is low, since state of charge (SOC) is not taken into account. Even with low initial SOC, the battery may evolve gas significantly in the last quarter of the charging cycle.

Some other chargers use constant voltage charging techniques for a specified time selecting a charge voltage which is lower than the gas voltage. This method may often lead to undercharging. Theoretically it takes an infinite time to charge a battery completely by this method since the charge current decreases asymptotically.

A charger from Westinghouse Devenset Rectifier of England employs another variation of this technique. The battery is supplied with a charging current until the battery voltage reaches a predetermined level corresponding to the gas evolution voltage (Vgas). The charging is continued from this stage by a timer for a specified period, followed by an equalizing charge. The battery is then placed under trickle charge to compensate for the open circuit self-discharge loss. The energy loss during the timer controlled charge period is still considerable and detrimental to the battery.

The charger introduced by Oldham/Harmer & Simmons of England passes a charging current to the battery until the voltage rises to the gas evolution voltage. The charger then alternates between a measuring cycle and a charging cycle. In the measuring cycle, the charge current is measured while the battery is charged under the constant voltage mode corresponding to the gas voltage. The charge is terminated when the currents in two successive measuring cycles are equal.

A charger employing periodic discharge pulses during the charge regime has been commercialized by Christie Electric Corp. State of the charge is derived from the current during the discharge pulse. This charger has been designed for small low capacity batteries.

The prior art has also described chargers using computers/microprocessors to perform analytical and control functions. One of the earliest chargers of this type analyzes voltage-current (I-V) characteristics during an applied current ramp to the battery. The I-V data is determined for each cell in the battery and compared with the average of all the cells. If any cell exhibits significantly different characteristics, the battery is diagnosed as defective. However, for practical purposes the cells in batteries are often inaccessible.

Another charger of this class uses the slope of the voltage current curve, obtained from the I-V characteristics as described above, to determine the state of charge of the battery. This is accomplished by comparing the above slope with those of average I-V characteristics of similar batteries at various charge levels (SOCs).

Yet another microprocessor based charger that uses I-V characteristics of current ramping test cycle has been proposed in EP 067589 and 067590. The I-V characteristics of the batteries of different capacities (within a narrow limit) and states of charge are stored in memory. They are compared with that of the battery being charged to determine SOC. If no match is found, the charger assumes a fault condition and calls for the attention of the operator. The battery is charged until the I-V characteristics are almost the same in successive test cycles.

All the chargers proposed in the state of the art are limited to batteries of certain nominal voltage and capacity within a narrow range. The fault-detecting diagnostics are also limited. For example, mismatched cells and soft-shorting are not signaled separately. Clearly, there is a need for a charger that can automatically identify the operating characteristics of the battery, detect fault conditions, and carry out charging with high efficiency and speed.

SUMMARY OF THE INVENTION

One aspect of this invention relates to methods of charging a rechargeable battery, as for example a lead-acid battery, of any capacity and voltage. One method of this invention comprises the steps of:

(a) measuring the open circuit voltage of a rechargeable battery and estimating the minimum number of cells possible for the measured open circuit voltage;

(b) charging said battery at any charge rate and at a constant or substantially constant current until the battery charge voltage equals or is substantially equal to the estimated number of cells of the battery multiplied by a predetermined voltage which is characteristic of the battery;

(c) charging said battery at any charge rate and at a constant or substantially constant voltage equal to or substantially equal to the battery charge voltage of step (b) until the charge current decreases to a predetermined low value;

(d) repeating steps (a), (b) and (c) until step (a) indicates a constant or substantially constant value for the estimated number of cells;

(e) charging said battery at a constant or substantially constant voltage equal to or substantially equal to said value of step (d) times a voltage which is characteristic of the battery cells until the current decreases to zero or a predetermined low valve; and (f) charging said battery with a pre-determined constant or substantially constant current at any voltage for a pre-determined period of time.

Through use of the method of this invention secondary batteries can be charged with maximum efficiency and speed, without shortening the life of the battery by exposure to severe charging conditions. Moreover, the method of this invention can be used to detect fault conditions in the battery, and to determine battery capacity, state of charge and nominal battery voltage. Furthermore, the method of this invention is suitable for use with batteries of all types and sizes, and can be used without the need for predetermined operational characteristics.

BRIEF DESCRIPTION OF THE DRAWINGS

The following detailed descriptions, given by way of example, will be best understood in conjunction with the accompanying drawings in which.

DESCRIPTION OF THE PREFERRED EMBODIMENT

Figure 1:
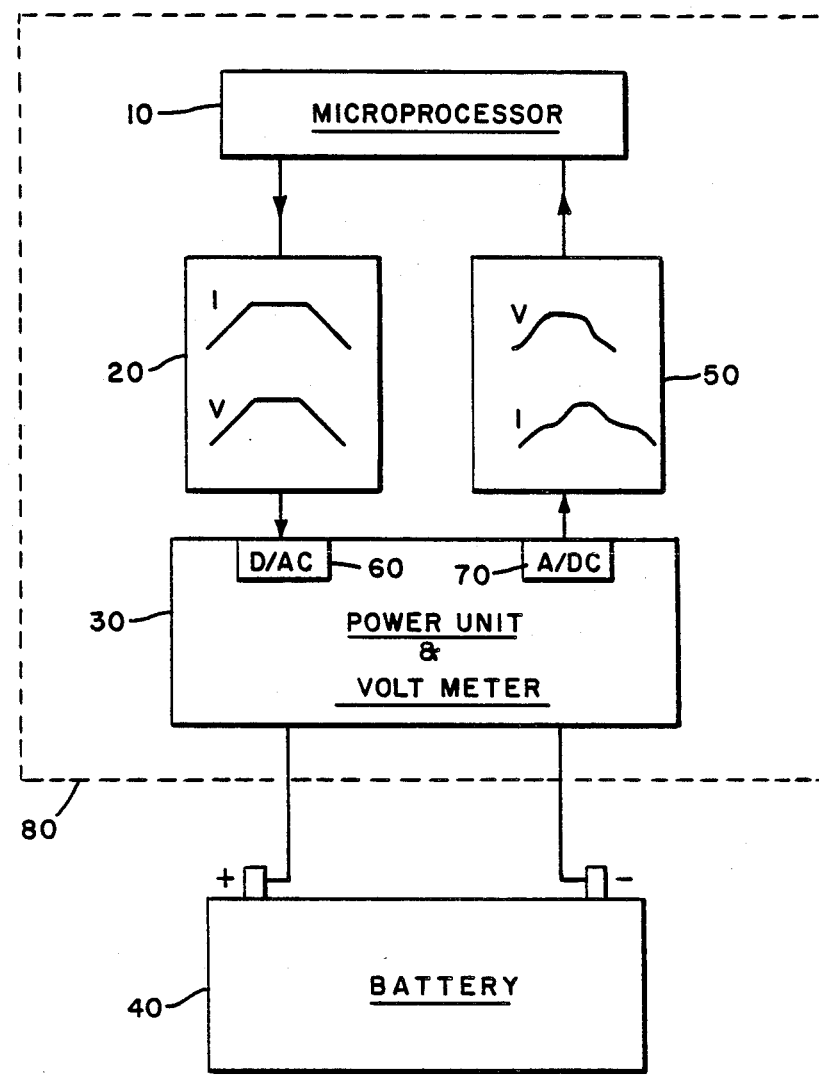
FIG. 1 is a block diagram of an apparatus capable of carrying out the method of the present invention.

Charger 80 illustrated in FIG. 1 consists of a microprocessor 10, and power unit 30 attached to a battery 40. Microprocessor 10 and power unit 30 may be put together in one unit as an "intelligent" power supply or may exist as two individual units interfaced with appropriate software and hardware. Microprocessor 10 sends commands 20 to power unit 30 and thus control its performance and operating characteristics. Microprocessor 10 is controlled by the software incorporated in its memory. Microprocessor 10 also analyzes data 50 received from power unit 30 and determines appropriate action and further course of the charging process.

Power unit 30 merely functions as a slave to microprocessor 10 and outputs current and/or voltage as commanded by microproprocessor 10. In addition to the power output (voltage/current), power unit 30 preferably can close and open the charging circuit. Power unit 30 preferably also has diodes to protect the battery discharging into power unit 30. Power unit 30 preferably has subassembly resembling voltmeter which is capable of measuring battery voltage and the charge current through a shunt or similar device. There is no difference in the hardware connections for the ramp cycle and the charge cycle. Their difference is only in the software commands sent by microprocessor 10 to power unit 30 and hence the power (voltage or current) output. Power unit 30 preferably has a digital to analog converter 60 which converts digital commands 20 received from microprocessor 10 into analog signals that control the functions of the power unit. Power unit 30 also has an analog to digital converter 70 which transforms the analog data from power unit 30 to digital data 50 and sends same to microprocessor 10. The system consisting of microprocessor 10, the software and power unit 30 with all its accessories hereafter is referred to as the charger 80.

Power unit 30 has a starter switch (not shown) which is switched on to start the charging process after battery 40 is connected to charger 80. In addition, power unit 30 has a manual/auto switch (not shown). In manual position, charger 80 allows the operator to fix the charging current and voltage and also permits the user to control all the functions of charger 80 manually. In the auto position, charger 80 controls all functions automatically according to the battery characteristics, detects faulty conditions, if any, and charges most efficiently and quickly.

Battery 40 is any type of rechargeable battery such as nickel-cadmium, nickel-hydrogen, lead-acid, nickel-zinc, nickel-iron, silver-zinc, zinc bromine, zinc-chlorine and the like. However, in the preferred embodiments of the invention, lead-acid batteries are used.

The following description of the drawings which refer to any type of lead-acid battery, is for illustration purposes only, and should not be construed as limited to the said battery type. It is appreciated, however, that certain parameters as for example the cell voltage corresponding to completely discharged and charged states, and gas voltage will have different values, depending on the specific type of battery, and should be properly incorporated into the software commands. The lead-acid battery consists of plurality of cells depending on the voltage requirement of the application. Each lead-acid cell has a voltage of about 2.2 V when fully charged and a voltage of 2 V when fully discharged. These values can be higher or lower depending on the polarization or the rest period after the battery's last charge or use. The cell voltage lies between these values for intermediate states of charge. The capacity of the battery can be of any value ranging from a few Ah to hundreds or even thousands of Ah depending on the application.

All control and measurement functions are initiated and commanded by microprocessor 10 and they are executed by power unit 30. For example, to generate a linearly increasing voltage ramp, microprocessor 10 initially sets up a limit for the voltage and current output. Depending on the slope of the voltage ramp, resolution and total response times of microprocessor 10 and power unit 30, microprocessor 10 periodically sends commands 20 to power unit 30 requiring the appropriate voltage output. Power unit 30 then waits for a predetermined period, measures the response current and passes data 50 to microprocessor 10, which then commands power unit 30 to output the next required voltage level. This sequence continues until the set limit of the voltage or current is reached, whichever happens earlier. During the above sequence, the current passing through the battery 40 is predominantly determined by the battery's characteristics, as for example battery capacity, internal resistance and state of charge.

Figure 2:
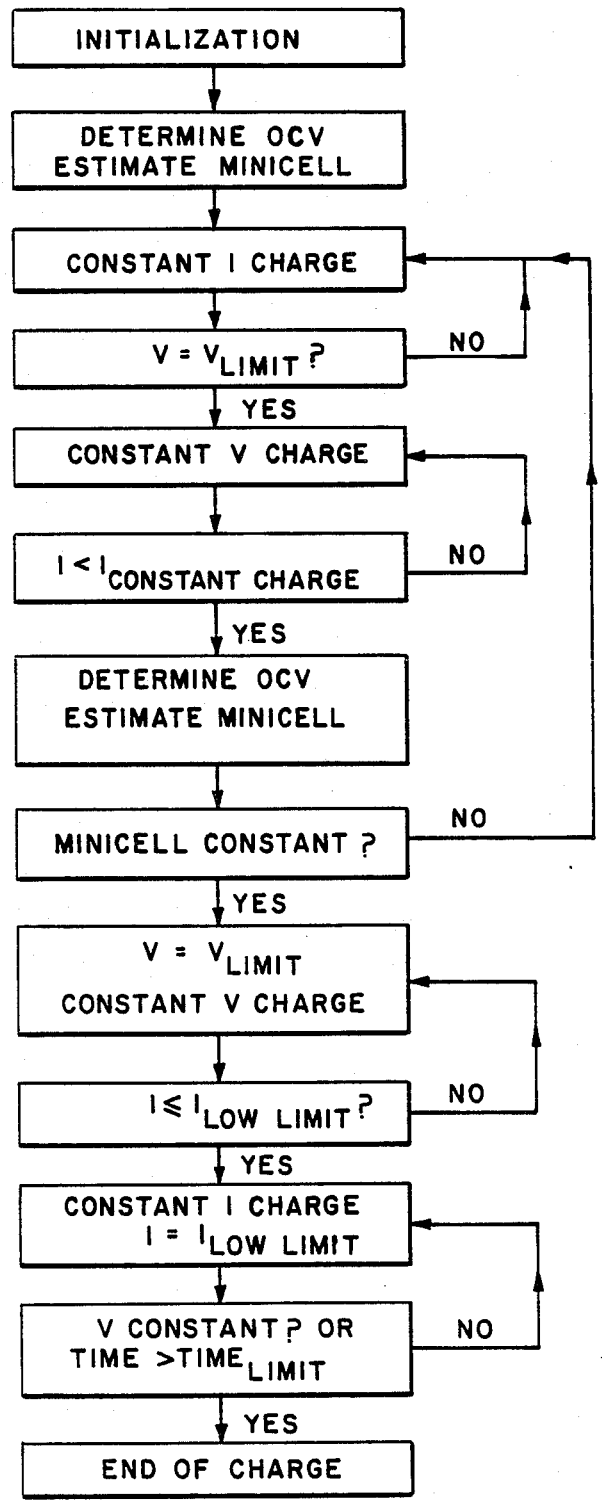
FIG. 2 is a flow diagram of a preferred embodiment of this invention.

A flow chart of a preferred method of operating charger 80 is shown in FIG. 2. When battery 40 is connected to charger 80 and started, all variables such as the state of charge (SOC), minimum (MINCEL) number of cells, charge current (CCC), and charge voltage (CMV) are initialized.

Determination of the true open circuit voltage of the battery is the first step(a) of the method shown in FIG. 2. The voltage measured across the terminals of battery 40 when no current is passed to or from battery 40 is normally known in the art as the open circuit voltage (OCV) of the battery. Soon after a battery, such as a lead-acid battery, is discharged or charged, the voltage measured across the battery terminals changes even though the battery is in open circuit, due to the non-uniformity of the electrolyte concentration in the pores of the electrodes and the bulk, normally known as the concentration polarization. The polarization decreases with time due to diffusion and convection of the electrolyte between the bulk and the electrode pores and hence the voltage between the terminals approaches a constant value reflecting its state of charge, which is a measure of the available energy in the battery in terms of its total capacity.

Charger 80 determines the true open circuit voltage (OCV) by measuring the battery terminal voltage in open circuit repeatedly for a predetermined period as for example (1 to about 10 minutes) at a convenient interval as for example (1 to about 10 seconds) and extrapolating to a long interval as for example (2 to about 4 hours). The measured battery voltage (V) varies with log time (log t) linearly. The mathematical equation for this straight line relationship between V and log t ($V = m \log t + c$, where m is th slope and c is intercept) is determined using the data measured for a few minutes as mentioned above. It is obvious that the open circuit voltage after complete depolarization is obtained by inserting a generally accepted time for relaxation (2 or more hours) in the said equation and evaluating V. Various characteristic of the battery can be determined from the true open circuit voltage. For example, the state of charge (SOC) of lead-acid batteries can be determined from the open circuit voltage. The open circuit voltage of a battery increases linearly as its state of charge increases from 0 to 100%.

For example, the open circuit voltage of lead-acid cell varies linearly from 2 to 2.2 V as its state of charge increases from 0 to 100%. The state of charge (SOC) can be determined from open circuit voltage several times during the course of charge process using the equation:

$$SOC = ((OCV/NOC) - 2.0) \times 100/0.20 \quad (1)$$

This equation is based on the true OCV excluding the electrode concentration polarizations. However, the measured OCV invariably includes electrode polarization. The true OCV can be obtained by using different values for the denominator can be employed to account for this polarization at the time of OCV measurement. For example, when the OCV measurement is made 5–10 minutes after placing the battery in open circuit the denominator 0.26 can be substituted for 0.20. Thus, the following equation may be used in this case.

$$SOC = ((OCV/NOC - 2.0) \times 100/0.20 \quad (2)$$

Usually, since the battery is relaxed between the time of use and the start of charging time to determine the initial OCV measurement equation 1 may be used. This is not true in other mid-test cycles during the course of charging and equations such as the equation 2 can be used. The voltage due to concentration polarization can be eliminated by letting the electrode equilibrate with the bulk electrolyte for a few hours. Since it is not practical to wait such a long period, especially when most of the depolarization occurs in the first few minutes, a 5 to about 10 minute waiting period and the equation with larger denominator of 0.26 can be used to take care of the remaining polarization. The preferred method for determining the state of charge based on the battery voltage and log t using equation (1) as described earlier.

Having determined the OCV of the battery 40, microprocessor 10 evaluates battery 40 for some possible defect conditions. The operator is warned by an alarm or flash for appropriate action, if any fault condition requiring the operator's attention is found. Several fault conditions of battery 40 can be detected using the method and charger. If the measured OCV is less than $-1$ V, it indicates that battery to charger connections are reversed. If the OCV is between $+1$ and $-1$ V, no battery 40 is connected to the charger 80 or the connections are very poor. If the OCV is more than $+1$ V, but no current flows if the current or voltage supplied to battery 40 by power unit 30 is inreased it is indicative of high resistance in the circuit. This may arise from any of the following factors including bad connections, corroded terminals, loss of electrolyte, bad relay connections in the charger and very heavily sulfated cells. If the internal resistance as determined is higher than a set limit, the charger activates a warning signal. The presence of a soft-short circuited cell is indicated if mismatched cells are found with one or more cells having very low capacity.

In the next step (b) of the method of FIG. 2, the OCV is fed into microprocessor 10 which then determines the minimum (Minicell) number of cells possible for the OCV of battery 40, and thus fixes the minimum number of cells in battery 40. Microprocessor 10 is programmed such that the minimum number of cells are calculated from the open circuit voltage (OCV) using the formula:

$$\text{Minicell} = (OCV/p) + (OCV \times 0.03/p) \quad (3)$$

wherein the constant p is characteristics of the type of battery, and correspond to the cell voltage of a completely charged cell. In the case of the preferred lead-acid battery, p is equal to 2.2. In the above equations, the multiplication factor (0.03) accounts for the possible changes in OCV at low temperatures.

In step (b) the battery is charged at a constant or substantially constant pre-determined current, usually equal to the maximum current that power supply 30 can deliver (or according to the battery capacity) until the battery voltage reaches a value equal to or substantially equal to the minimum estimated number of cells multiplied by a voltage which is characteristic of the battery. In the case of the preferred lead acid battery this value is 2.5.

Figure 3:
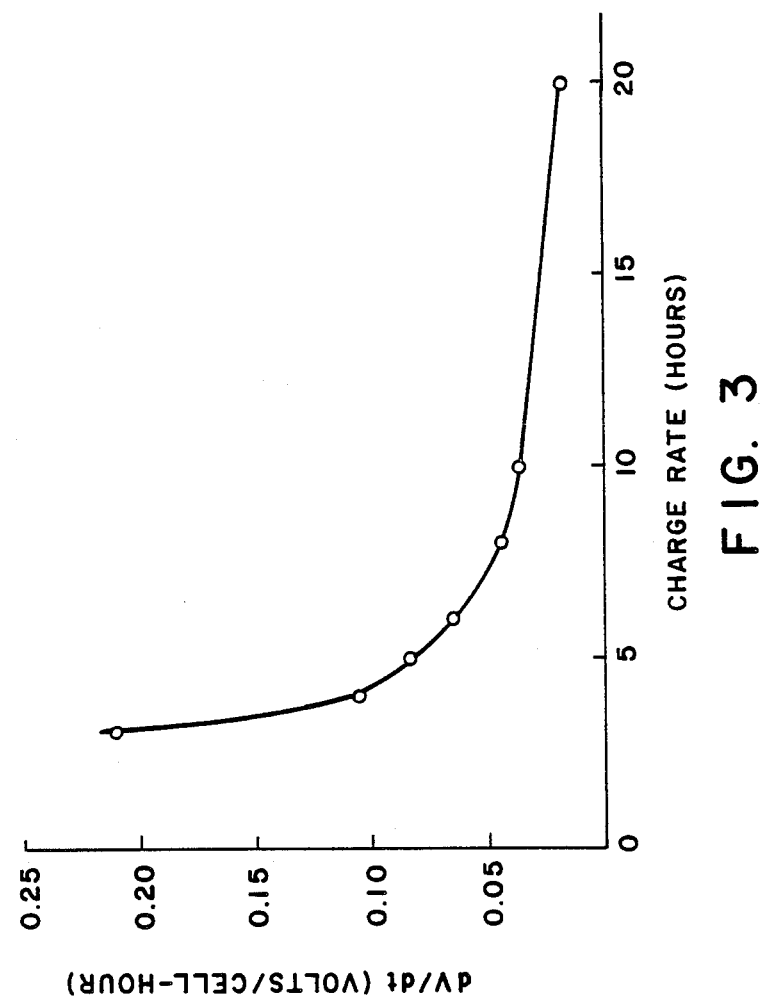
FIG. 3 is a plot which shows the dependency of the rate of change of battery voltage on the charge rate.

If the maximum charge current is desired to be based on the battery capacity or at a specific charge rate (e.g. 5 or 6 hour rate), it can be implemented using the dV/dt of the charge curve. The relationship between the rate of change of battery voltage and the charge rate is shown in FIG. 3. The battery can be charged at any desired rate by making charger 80 adjust the charge current continuously such that dV/dt is maintained at the corresponding value given by the data in FIG. 3. Processor 10 automatically determines the level of the charge current depending on the desired charge rate set by the operator. If the operator has not selected a charge rate, processor 10 assumes the default value of 6 hour charge rate. For example, a 60 Ah battery is charged at 10 A constant current according to the default value of 6 hour charge rate. The relationship between the charge rate and the rate of increase of a lead-acid cell voltage is shown in FIG. 3. The data of this figure is stored in memory. Processor 10 adjusts the charge current such that the rate of change of the battery voltage conforms to the value found in the said data in memory corresponding to the selected charge rate.

During this constant or substantially constant current charge period, hhe battery voltage increases and reaches the said limit value which equals or is substantially equal to estimated number of cells of the battery multiplied by a predetermined voltage which is characteristic of the particular battery. Since processor 10 does not let the charge voltage rise beyond the said limit, the charge current decreases. When the said current falls to a predetermined percentage of the constant charge current, the microprocessor 10 opens the charging circuit. Battery 40 is kept in open circuit for a predetermined period as for example about (1 to about 10 minutes).

In the next step (c) of this method, the battery charging continues at any charge rate in the constant or substantially constant voltage charging mode with the voltage equal to or substantially equal to the estimated number of cells (NOC) times some voltage value which is characteristic of the type battery. With lead-acid batteries, this value is from about 2.35 to about 2.6 V, preferably 2.5 V/cell. This charging at constant or substantially constant voltage is continued until the charge current falls to a predetermined low limit, for example from about 0.5 to about 1 A. During this step (c) of the method, the charge current is allowed only to decrease. Preferably, processor 10 does not permit the current to increase even if it requires a decrease in the charge voltage.

In the next step (d), steps (a), (b) and (c) described above are repeated until step (a) indicates a constant or substantially constant value for the estimated number of cells. This relatively constant or substantially constant value generally represents the true number of cells in the battery, and can be used to calculate an upper limiting voltage at which the cell will evolve gas using the following equation:

$$V_{gas} = n \times NOC$$

where NOC is the constant or substantially constant value for the estimated number of cells; n is a value which is characteristic of the type of battery which in the case of lead-acid batteries is 2.50; and $V_{gas}$ is the voltage at which gas evolution occurs and generally falls in the range of from about 2.35 to about 2.65 v/cell for lead-acid cells. The cell voltage at which gas evolution occurs, and the voltage value will differ in other types of secondary batteries.

In the next step (e) of this method, the battery charging is continued in the constant or substantially constant voltage charging mode with the voltage set at a value equal to or substantially equal to the minimum ultimate number of cells times some voltage value which is characteristic of the type battery. With lead-acid batteries this value is from about 2.35 to about 2.6 V, preferably 2.5 V/cell. This charging at constant or substantially constant voltage is continud until the charge current falls to a predetermined low limit, for example from about 0.5 to about 1 A. During this step (e) of the method, the charge current is allowed only to decrease. Preferably, processor 10 does not permit the current to increase even if it requires a decrease in the charge voltage.

In step (f), microprocessor 10 starts charging the battery under the low limit constant or substantially constant current mode at any voltage for a predetermined period of time. The battery is charged at a constant or substantially constant current (preset low limit), for example, at a current of from about 0.5 to about 1 A.

The following specific examples are presented to more particularly illustrate the invention and are not to be construed as limitations thereon.

EXAMPLE I

Charging with different initial SOC

A 20 Ah battery was discharged to various known depths, and then recharged with the apparatus of this invention. The charge output from the battery during discharge, the corresponding state of charge, the subsequent charge input to the battery during the charge process, and the percent of the charge wasted are shown in Table 2.

TABLE 2

| Charge Details at different initial states of charge | | | |
|---|---|---|---|
| Discharge (Ah) | Charge (Ah) | Initial Soc (%) | % Waste* (of charge) |
| 19.75 | 20.20 | 0 | 1.0 |
| 15.87 | 16.70 | 24 | 4.9 |
| 11.21 | 11.60 | 44 | 3.4 |
| 8.07 | 8.90 | 60 | 9.4 |
| 3.38 | 4.03 | 83 | 16.0 |
| 0 | 0.36 | 100 | 100.00 |

EXAMPLE II

Charging different type of batteries

Lead-acid batteries of flooded type (excess electrolyte with capacities of 20 Ah and 50 Ah, a sealed (starved) lead-acid battery of 100 Ah, a SLI battery of 34 Ah, and a motorcycle battery of 5.5 Ah were discharged to known depths. They were recharged successfully with the charger of this invention. Possible defects like soft-shorted cells in the motorcycle battery were indicated by the charger.

EXAMPLE III

Mismatched Cells

A 10 Ah and 12 Ah battery were connected in series and charged with the charger of this invention. Mismatched cells were indicated. In another instance 14-cells of 20 Ah and a 1-cell 50 Ah battery were connected in series and charged as one battery. The charger indicated the presence of mismatched cells.

EXAMPLE IV

Sulfated Cells

A 20 Ah battery was discharged to the low cut-off limit of 1.75 V/cell, and left in open circuit for 3 days. After this period when charged with said charger, the message, "Presence of sulfated cells" was indicated by the charger, yet the battery was charged successfully. The same procedure was repeated with an open circuit period of 8 days after discharge with the same result.

EXAMPLE V

Soft-Shorted Cells

The presence of soft-shorted cells is one of the common failure modes of lead acid battery. Generally the shorted cell behaves like a normal cell with low capacity during charge, but becomes a dead cell (loses voltage) during discharge and in long open circuit periods. The time when the cell gets activated during charge is unpredictable. To some extent, this time of activation depends on how hard the short is and the state of charge.

Our tests on this aspect were carried out using a 5 Ah 6 V motor cycle battery. Experiments were done at various initial SOC. At high initial SOC, the soft shorted cell became active during the first test (ramp) cycle. With the lower initial SOC, the cell got activated only during the charge cycle. Nevertheless, the charger detected and signaled the presence of the soft-shorted cell.

EXAMPLE VI

No Connection

The charger was started without connecting any battery. The result was the message by the computer, "No battery connected".

EXAMPLE VII

High Resistance

During the series of experiments, the relay contacts developed a highly resistive film. This was indicated by the charger. Also when the terminals are highly corroded and connected to the charger without cleaning them, the high resistance is noted. In both instances the following message was flashed by the computer.

"Check water in battery"
"Check relay contacts"
"Check terminal connections"

EXAMPLE VIII

Reverse Connections

The positive terminal of the battery was connected to the negative in the charger, and the negative terminal of the battery to the positive of the charger. The charger warned of reverse connections.

What is claimed is:

1. A method for charging a rechargeable battery which comprises the steps of:
   (a) measuring the open circuit voltage of said battery and estimating the minimum number of cells possible for the measured open circuit voltage;
   (b) charging said battery at any charge rate and at a substantially constant or constant current until the battery charge voltage equals or is substantially equal to the estimated number of cells of the battery multiplied by a predetermined voltage which is characteristic of the battery;
   (c) charging said battery at a charge rate and at a constant or substantially constant voltage equal to or substantially equal to the battery charge voltage in step (b) until the charge current decreases to a predetermined low value;
   (d) repeating steps (a), (b) and (c) until step (a) indicates a constant or substantially constant value for the estimated number of cells;
   (e) charging said battery at a constant or substantially constant voltage equal to or substantially equal to said constant or substantially constant value of step (d) times a voltage which is characteristic of the battery cells until the current decreases to zero or a predetermined low value; and
   (f) charging the said battery with a predetermined constant or substantially constant current at any voltage for a predetermined period of time.

2. A method according to claim 1 wherein said battery is a lead-acid battery.

3. A method according to claim 1 which further comprises determining the state of charge of the battery from the measured open circuit voltage of said battery.

4. A method according to claim 1 which further comprises determining the presence of fault conditions from the measured open circuit voltage of said battery.

* * * * *